United States Patent
Venkatraman et al.

(10) Patent No.: US 10,278,151 B2
(45) Date of Patent: Apr. 30, 2019

(54) COMBINED FINE TIMING MEASUREMENT (FTM) AND NON-FTM MESSAGING FOR ESTIMATING TURN-AROUND CALIBRATION FACTOR

(71) Applicant: QUALCOMM Incorporated, San Diego, CA (US)

(72) Inventors: Sai Pradeep Venkatraman, Santa Clara, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 15/183,462

(22) Filed: Jun. 15, 2016

(65) Prior Publication Data

US 2017/0367063 A1 Dec. 21, 2017

(51) Int. Cl.
| | |
|---|---|
| *H04W 56/00* | (2009.01) |
| *H04L 12/841* | (2013.01) |
| *H04W 64/00* | (2009.01) |
| *G01S 5/02* | (2010.01) |
| *H04W 84/12* | (2009.01) |
| *H04L 12/26* | (2006.01) |

(Continued)

(52) U.S. Cl.
CPC ......... *H04W 56/0085* (2013.01); *G01S 5/021* (2013.01); *H04L 47/283* (2013.01); *H04W 56/004* (2013.01); *H04W 56/006* (2013.01); *H04W 64/003* (2013.01); *H04W 64/006* (2013.01); *G01S 5/0236* (2013.01); *G01S 5/0242* (2013.01); *G01S 5/0263* (2013.01); *G01S 5/0289* (2013.01); *G01S 5/14* (2013.01); *H04L 43/0864* (2013.01); *H04W 4/023* (2013.01); *H04W 4/025* (2013.01); *H04W 24/10* (2013.01); *H04W 84/12* (2013.01)

(58) Field of Classification Search
CPC ............ H04W 64/006; H04W 64/003; H04W 56/0085; H04W 56/004
See application file for complete search history.

(56) References Cited

U.S. PATENT DOCUMENTS

| | | | |
|---|---|---|---|
| 9,237,546 B1 * | 1/2016 | Zhang | H04W 4/02 |
| 2012/0122484 A1 * | 5/2012 | Marchenko | G01S 5/021 |
| | | | 455/456.1 |

(Continued)

OTHER PUBLICATIONS

International Search Report and Written Opinion—PCT/US2017/032672—ISA/EPO—dated Aug. 21, 2017.

*Primary Examiner* — Anh Vu H Ly
*Assistant Examiner* — Hector Reyes
(74) *Attorney, Agent, or Firm* — Thien T. Nguyen (57) ABSTRACT

In one aspect, a method includes performing, by a wireless station, a fine timing measurement (FTM) procedure that includes exchanging one or more FTM messages between the wireless station and an access point to obtain a first round-trip time (RTT) between the wireless station and the access point. The method also includes performing, by the wireless station, a non-FTM procedure to obtain a second RTT between the wireless station and the access point. The wireless station then calculates a turn-around calibration factor (TCF) estimate of the access point based on a difference between the second RTT and the first RTT. Data representative of the TCF estimate of the access point may then be sent to a server.

30 Claims, 7 Drawing Sheets

(51) Int. Cl.
  *G01S 5/14*     (2006.01)
  *H04W 4/02*    (2018.01)
  *H04W 24/10*   (2009.01)

(56) References Cited

U.S. PATENT DOCUMENTS

| | | |
|---|---|---|
| 2013/0307723 A1 | 11/2013 | Garin et al. |
| 2014/0087751 A1 | 3/2014 | Do et al. |
| 2014/0160959 A1* | 6/2014 | Aldana ............... H04L 43/0864 370/252 |
| 2014/0185520 A1* | 7/2014 | Gao .................... H04W 64/00 370/328 |
| 2014/0187259 A1 | 7/2014 | Kakani et al. |
| 2014/0200026 A1* | 7/2014 | Aldana ................ G01S 5/0205 455/456.1 |
| 2014/0213193 A1 | 7/2014 | Zhang et al. |
| 2014/0254511 A1* | 9/2014 | Aldana .............. H04W 56/003 370/329 |
| 2014/0269400 A1 | 9/2014 | Aldana et al. |
| 2015/0126217 A1* | 5/2015 | Do ....................... G01S 5/0252 455/456.1 |
| 2015/0181553 A1 | 6/2015 | Segev |
| 2016/0183171 A1* | 6/2016 | Hareuveni ........... H04W 64/00 370/328 |

* cited by examiner

COMBINED FINE TIMING MEASUREMENT (FTM) AND NON-FTM MESSAGING FOR ESTIMATING TURN-AROUND CALIBRATION FACTOR

FIELD OF DISCLOSURE

Aspects of this disclosure relate generally to wireless communications, and more particularly to wireless local area network (WLAN) access point (AP) positioning and navigation systems.

BACKGROUND

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). One class of such multiple-access systems is generally referred to as wireless location area networks (WLANs), such as "Wi-Fi," and includes different members of the Institute of Electrical and Electronics Engineers (IEEE) 802.11 wireless protocol family. Generally, a Wi-Fi communication system can simultaneously support communication for multiple wireless devices, such as wireless stations (STAs). Each STA communicates with one or more access points (APs) via transmissions on the downlink and the uplink. The downlink (DL) refers to the communication link from the APs to the STAs, and the uplink (UL) refers to the communication link from the STAs to the APs.

Modern navigation systems have typically used satellite-based global positioning system (GPS) for position determination. However, the recent proliferation of WLAN (e.g., Wi-Fi) access points has made it possible for navigation systems to use these access points for position determination, especially in urban areas where there is usually large concentration of WLAN access points. WLAN navigation systems can be advantageous over GPS navigation systems because of limitations of GPS signal coverage. For example, while GPS signals may not be readily available inside a shopping mall, wireless signals generated by WLAN access points inside the shopping mall would be more readily detectable by a STA.

More specifically, for WLAN navigation systems, the locations of the WLAN access points are used as reference points from which well-known trilateration techniques can determine the location (e.g., absolute location and/or relative location) of a wireless device (e.g., a Wi-Fi-enabled cell phone, laptop, or tablet computer). The wireless device can use the round trip time (RTT) of signals transmitted to and from the access points to calculate the distances between the wireless device and the access points. Once these distances are calculated, the location of the wireless device can be estimated using trilateration techniques.

One procedure for determining RTT captures the amount of time between the transmission of a unicast packet, such as a data packet or request to send (RTS), by STA to an AP and the reception of the appropriate response packet, which may be an acknowledgement (ACK) or clear to send (CTS), as measured by the STA. RTT is typically measured in nanoseconds, but can be done in picoseconds.

Some chip designs may allow recording of the time of departure (TOD), from the STA and also time of arrival (TOA) at the STA, using timestamps. The timestamps permit measurement of RTT. This method may be referred to as an RTS/CTS or QOS Null/Ack-based RTT procedure (also referred to herein as a non-fine timing measurement (FTM) procedure).

However, in measuring RTT there is a variable amount of turnaround time delay involved at the AP, or receiving node, that needs to be accounted for before the RTT may be used for ranging calculations. These ranging calculations using RTT are made by extracting the time of flight between the STA and the AP, which requires knowledge of the turn-around calibration factor (TCF). TCF may be implementation specific and may depend on the short interframe space (SIFS), time of arrival uncertainty, and other delays at the AP. The TCF varies depending on the chipset used by the AP.

Another method for determining the range between nodes is often referred to as the Fine Timing Measurement (FTM) protocol. Based on FTM, a STA exchanges FTM messages with the AP and then receives timing information (e.g., timestamps corresponding to departure time of the FTM message and the arrival time of the Ack to the FTM message at the AP) from the AP. The STA then computes its range to the AP based on the timing information.

While FTM procedure may offer increased accuracy and/or reliability for position determinations, some legacy STAs are not configured to use the FTM procedure. Thus, when a legacy STA uses an FTM-capable AP for positioning, the legacy STA will still have to use the non-FTM procedure (e.g., the RTS/CTS or QOS Null/Ack-based RTT procedure). However, as mentioned above, the RTS/CTS-based RTT procedure requires knowledge of the APs TCF (i.e., the APs turn-around calibration factor).

SUMMARY

Aspects of the present disclosure include a method, a wireless station, a server, and a computer-readable medium for assisting or otherwise performing RTT measurements in a WLAN utilizing one or more broadcast ranging messages.

For example, in one aspect, a method includes performing, by a wireless station, a fine timing measurement (FTM) procedure that includes exchanging one or more FTM messages between the wireless station and an access point to obtain a first round-trip time (RTT) between the wireless station and the access point. The method also includes performing, by the wireless station, a non-FTM procedure to obtain a second RTT between the wireless station and the access point. The non-FTM procedure includes: (i) transmitting a non-FTM message from the wireless station to the access point; (ii) receiving a non-FTM response message from the access point in response to the non-FTM message transmitted to the access point; and (iii) calculating, by the first wireless station, the second RTT based on a difference between a time of arrival of the non-FTM response message and a time of departure of the non-FTM message. The wireless station then calculates a turn-around calibration factor (TCF) estimate of the access point based on a difference between the second RTT and the first RTT. Data representative of the TCF estimate of the access point may then be sent to a server.

In another aspect, a wireless station includes a transceiver, at least one processor; and at least one memory coupled to the at least one processor. The at least one processor and the at least one memory are configured to direct the wireless station to perform a fine timing measurement (FTM) procedure that includes exchanging one or more FTM messages between the transceiver and an access point to obtain a first round-trip time (RTT) between the wireless station and the access point. The at least one processor and the at least one memory are also configured to direct the wireless station to perform a non-FTM procedure to obtain a second RTT between the wireless station and the access point. The non-FTM procedure includes: (i) transmitting a non-FTM message from the wireless station to the access point; (ii) receiving a non-FTM response message from the access point in response to the non-FTM message transmitted to the access point; and (iii) calculating, by the first wireless station, the second RTT based on a difference between a time of arrival of the non-FTM response message and a time of departure of the non-FTM message. The at least one processor and the at least one memory are further configured to direct the wireless station to calculate a turn-around calibration factor (TCF) estimate of the access point based on a difference between the second RTT and the first RTT, and to send data representative of the TCF estimate of the access point to a server.

In yet another aspect, a wireless station includes means for performing a fine timing measurement (FTM) procedure that includes exchanging one or more FTM messages between the wireless station and an access point to obtain a first round-trip time (RTT) between the wireless station and the access point. The wireless station also includes means for performing a non-FTM procedure to obtain a second RTT between the wireless station and the access point. The non-FTM procedure includes: (i) transmitting a non-FTM message from the wireless station to the access point; (ii) receiving a non-FTM response message from the access point in response to the non-FTM message transmitted to the access point; and (iii) calculating, by the first wireless station, the second RTT based on a difference between a time of arrival of the non-FTM response message and a time of departure of the non-FTM message. The wireless station further includes means for calculating a turn-around calibration factor (TCF) estimate of the access point based on a difference between the second RTT and the first RTT as well as means for sending data representative of the TCF estimate of the access point to a server.

In another aspect, a non-transitory computer-readable medium includes program code stored thereon. The program code includes instructions to direct a wireless station to: (a) perform a fine timing measurement (FTM) procedure that includes exchanging one or more FTM messages between the wireless station and an access point to obtain a first round-trip time (RTT) between the wireless station and the access point; (b) perform a non-FTM procedure to obtain a second RTT between the wireless station and the access point; (c) calculate a turn-around calibration factor (TCF) estimate of the access point based on a difference between the second RTT and the first RTT; and (c) send data representative of the TCF estimate of the access point to a server. In one example, the non-FTM procedure includes: (i) transmitting a non-FTM message from the wireless station to the access point; (ii) receiving a non-FTM response message from the access point in response to the non-FTM message transmitted to the access point; and (iii) calculating, by the first wireless station, the second RTT based on a difference between a time of arrival of the non-FTM response message and a time of departure of the non-FTM message.

In yet another aspect, a method includes receiving, at a server, turn-around calibration factor (TCF) estimates of an access point, from a plurality of wireless stations, where each TCF estimate is based on both a fine timing measurement (FTM) procedure and a non-FTM procedure performed by the plurality of wireless stations with the access point. The method also includes maintaining, at the server, a master TCF estimate for the access point based on the TCF estimates received from the plurality of wireless stations. The master TCF estimate is then provided to at least one wireless station.

In another aspect, a server includes at least one processor and at least one memory coupled to the at least one processor. The at least one processor and the at least one memory are configured to direct the server to receive turn-around calibration factor (TCF) estimates of an access point, from a plurality of wireless stations, where each TCF estimate is based on both a fine timing measurement (FTM) procedure and a non-FTM procedure performed by the plurality of wireless stations with the access point. The at least one processor and the at least one memory are also configured to direct the server to maintain a master TCF estimate for the access point based on the TCF estimates received from the plurality of wireless stations and to provide the master TCF estimate to at least one wireless station.

In yet another aspect, a server includes means for receiving, at the server, turn-around calibration factor (TCF) estimates of an access point, from a plurality of wireless stations, where each TCF estimate is based on both a fine timing measurement (FTM) procedure and a non-FTM procedure performed by the plurality of wireless stations with the access point. The server also includes means for maintaining, at the server, a master TCF estimate for the access point based on the TCF estimates received from the plurality of wireless stations. Means for providing the master TCF estimate to at least one wireless station is also included in the server.

In another aspect, a non-transitory computer-readable medium includes program code stored thereon. The program code includes instructions to direct server to: (i) receive turn-around calibration factor (TCF) estimates of an access point, from a plurality of wireless stations, where each TCF estimate is based on both a fine timing measurement (FTM) procedure and a non-FTM procedure performed by the plurality of wireless stations with the access point; (ii) maintain a master TCF estimate for the access point based on the TCF estimates received from the plurality of wireless stations; and (iii) provide the master TCF estimate to at least one wireless station.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
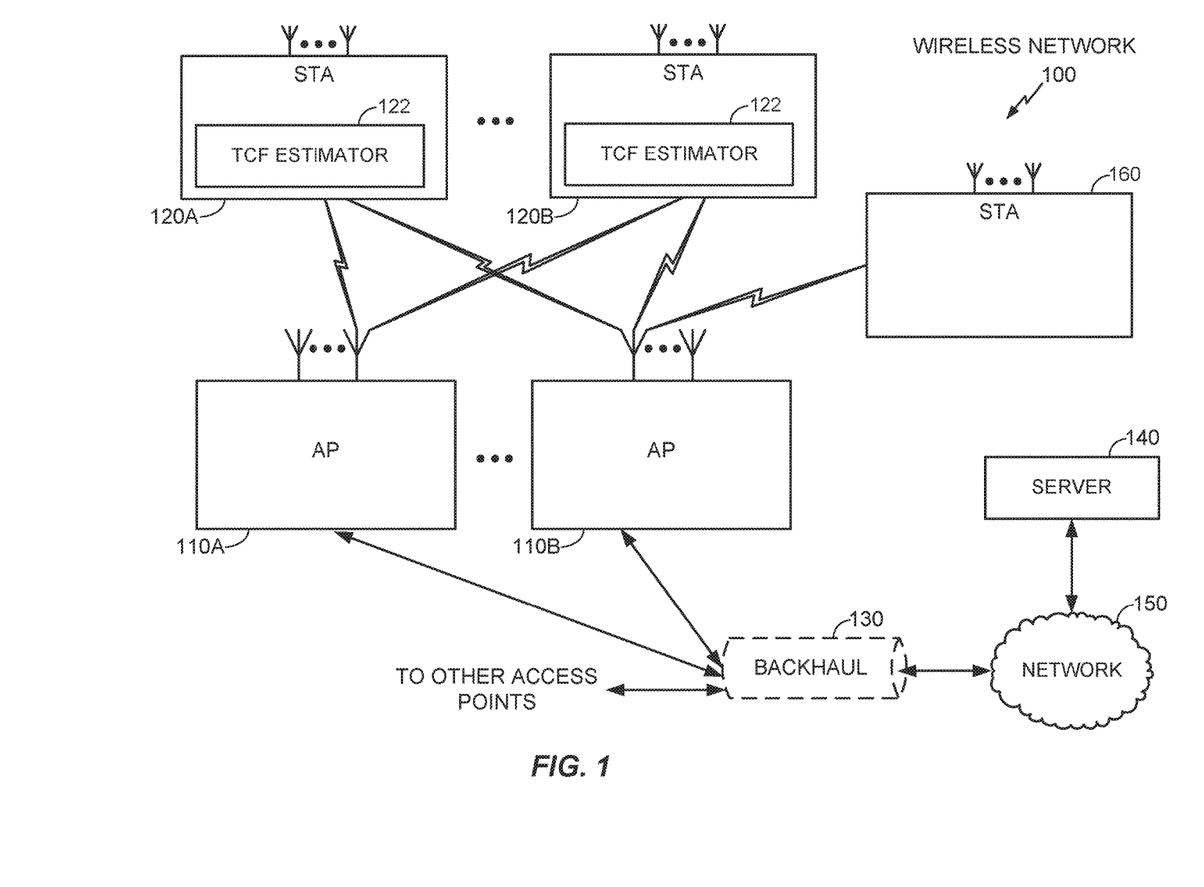
FIG. 1 illustrates an example wireless network employing a Wi-Fi protocol.

FIG. 1 illustrates an example wireless network 100. As shown, the wireless network 100, which may also be referred to herein as a Basic Service Set (BSS), is formed from several wireless nodes, including one or more Access Points (APs) 110A and 110B and a plurality of wireless stations (STAs) 120A, 120B and 160. Each wireless node is generally capable of receiving and/or transmitting. The wireless network 100 may support any number of APs 110A and 110B distributed throughout a geographic region to provide coverage for the STAs 120A, 120B, and 160. For simplicity, only two APs 110A and 110B are shown in FIG. 1, providing coordination and control among the STAs 120A, 120B, and 160, as well as access to other APs or other networks 150 (e.g., the Internet) via a backhaul connection 130. However, in other examples, the wireless network 100 may include many (more than two) APs, including several APs operating on the same WLAN channel and several other APs operating on different WLAN channels.

The APs 110A and 110B are generally fixed entities that provide backhaul services to the STAs 120A, 120B, and 160 in their geographic region of coverage. However, the APs 110A and 110B may be mobile in some applications (e.g., a mobile device serving as a wireless hotspot for other devices). The STAs 120A, 120B, and 160 may be fixed or mobile. Examples of STAs 120A, 120B, and 160 include a telephone (e.g., cellular telephone), a laptop computer, a desktop computer, a personal digital assistant (PDA), a digital audio player (e.g., MP3 player), a camera, a game console, a display device, or any other suitable wireless node. The wireless network 100 may be referred to as a wireless local area network (WLAN), and may employ a variety of widely used networking protocols to interconnect nearby devices. In general, these networking protocols may be referred to as "Wi-Fi," including any member of the Institute of Electrical and Electronics Engineers (IEEE) 802.11 wireless protocol family.

As discussed above, fine timing measurement (FTM) procedures for determining the round trip time (RTT) between a STA and an AP may offer increased accuracy and/or reliability when compared to non-FTM procedures (e.g., RTS/CTS-based RTT procedures), but the FTM procedure may not be available to all STAs in the wireless network 100. For example, the STAs 120A and 120B of FIG. 1 may be configured to perform ranging operations using a fine timing measurement (FTM) procedure and/or via a non-FTM procedure, whereas STA 160 may be configured to use a non-FTM procedure only for RTT measurements. In one example, STA 160 is a legacy device that does not include the capability to perform RTT measurements using an FTM procedure. In another example, STA 160 has the capability to perform FTM procedures, but that feature is disabled or otherwise incapacitated. Thus, in order to measure RTT between STA 160 and AP 110B, the STA 160 may rely solely on a non-FTM procedure, such as the RTS/CTS-based RTT procedure discussed above. However, as mentioned above, the RTS/CTS-based RTT procedure requires knowledge of one or more delays, such as the turnaround calibration factor (TCF) at the AP 110B.

Accordingly, STAs 120A and 120B, as well as server 140 may be variously configured in accordance with the teachings herein to provide or otherwise support the crowdsourcing of TCF estimates for APs 110A and 110B in wireless network 100 for determining RTT measurements by non-FTM capable STAs. In some aspects, the TCF estimates are generated by STAs 120A and 120B using both FTM and non-FTM procedures. Thus, as shown in FIG. 1, the STAs 120A and 120B may each include a TCF estimator 122 for estimating the TCF for one or more of the APs 110A and 110B in the wireless network 100. The STAs 120A and 120B may then send these TCF estimates to server 140 via network 150, where server 140 maintains the TCF estimates to provide them to legacy STAs, such as STA 160 to aide STA 160 in performing RTT measurements using the non-FTM procedures. These and other aspects will be described in more detail below.

Figure 2:
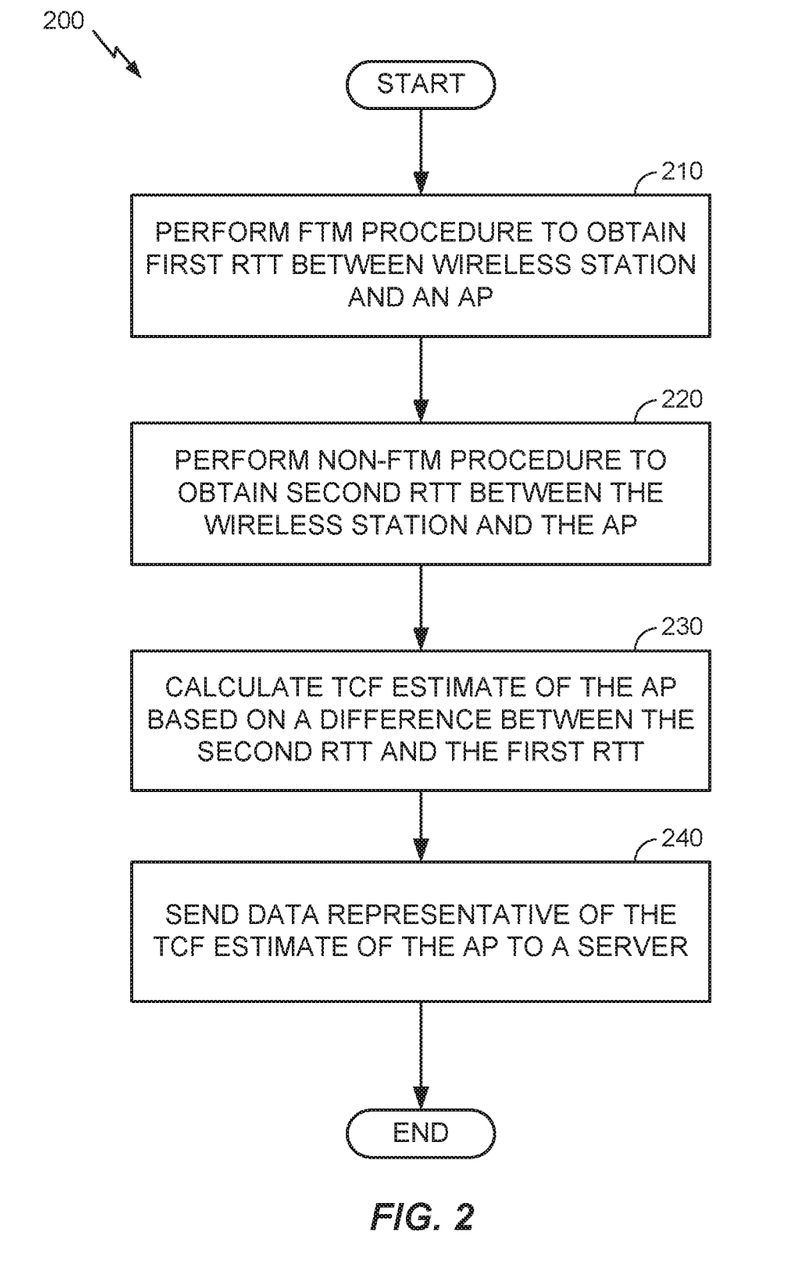
FIG. 2 is a flowchart illustrating a process of determining a TCF estimate of an access point using both an FTM and a non-FTM procedure.

FIG. 2 is a flowchart illustrating a process 200 of determining a TCF estimate of an access point using both an FTM and a non-FTM procedure by a STA (e.g., STA 120A under direction of TCF estimator 122).

In process block 210, STA 120A performs an FTM procedure to obtain a first RTT between the STA 120A and the AP 110A. In one aspect, the FTM procedure includes exchanging one or more FTM messages between the STA 120A and the AP 110A to obtain the first RTT. For example, the exchanging of FTM messages may include the STA 120A transmitting an FTM request message to the AP 110A, receiving an FTM response message from the AP 110A, transmitting an FTM acknowledgement message to the AP 110A, and then receiving timing information from the AP 110A. The timing information may indicate a time of departure of the FTM response message from the AP 110A, as well as a time of arrival of the FTM acknowledgement message at the AP 110A. In one example, the timing information is sent as timestamps from the AP 110A to the STA 120A. The STA 120A may then compute the first RTT using the timing information received from the AP 110A as well as timing information (e.g., timestamps) generated at the STA 120A, itself. Further details regarding the FTM procedure will be described below with reference to FIG. 3.

Next, in process block 220, the STA 120A performs a non-FTM procedure to obtain a second RTT between the STA 120A and the AP 110A. In one example, the non-FTM procedure includes transmitting a non-FTM message from the STA 120A to the AP 110A, receiving a non-FTM response message from the AP 110A in response to the non-FTM message, and calculating a second RTT based on a difference between a time of arrival of the non-FTM response message and a time of departure of the non-FTM message. By way of example, the non-FTM message may be a request to send (RTS) message and the non-FTM response message may be a clear to send (CTS) message. Thus, in one implementation, the STA 120A is configured to generate a timestamp corresponding to the time of departure when the RTS message is transmitted and to generate another timestamp corresponding to the time of arrival when the CTS message is received at the STA 120A. The STA 120A may calculate the second RTT by subtracting the time of departure of the RTS message from the time of arrival of the CTS message.

In one example, the STA 120A calculates the second RTT without compensating for any delays that may be imposed by the AP 110A in the processing of the non-FTM messages. Thus, any delays between when the AP 110A receives the non-FTM message and when the AP 110A transmits the non-FTM response message are included in the second RTT measurement, such that the second RTT measurement may be referred to as an uncompensated RTT measurement.

Next, in process block 230, the STA 120A calculates a TCF estimate of AP 110A based on a difference between the second RTT and the first RTT (e.g., TCF estimate=Second RTT–First RTT). In process block 240, the STA 120A sends data representative of the TCF estimate to a server 140. As will be described below, server 140 may the aggregate one or more TCF estimates received from STAs 120A and 120B to generate a master TCF estimate for AP 110A, which may then be provided to a non-FTM capable STA, such as STA 160 for aiding STA 160 in performing non-FTM procedures to determine an RTT between STA 160 and AP 110A.

Although FIG. 2 illustrates process 200 as performing the FTM procedure and then the non-FTM procedure, other examples may include performing the procedures in a reverse order. That is, STA 120A may perform the non-FTM procedure first and then perform the FTM procedure in accordance with the teachings herein.

Furthermore, STA 120A may be configured to repeat the performing of the FTM procedure (i.e., process block 210), the performing of the non-FTM procedure (i.e., process block 220), and the calculating of the TCF estimate (i.e., process block 230) to obtain an average TCF estimate for the AP 110A. In one example, the repeating is performed from a plurality of positions of the STA 120A such that the data sent to the server 140 is an average TCF estimate taken over the plurality of positions. In another example, the repeating is performed for a same position of the STA 120A, such that the data sent to the server 140 is an average TCF estimate for the same position of the STA 120A. The sending of an average TCF estimate may help reduce bandwidth consumption when compared to sending individual TCF estimates over wireless network 100. Furthermore, averaging multiple TCF estimates may reduce the impact of one or more erroneous RTT measurements during either the FTM or non-FTM procedures.

Figure 3:
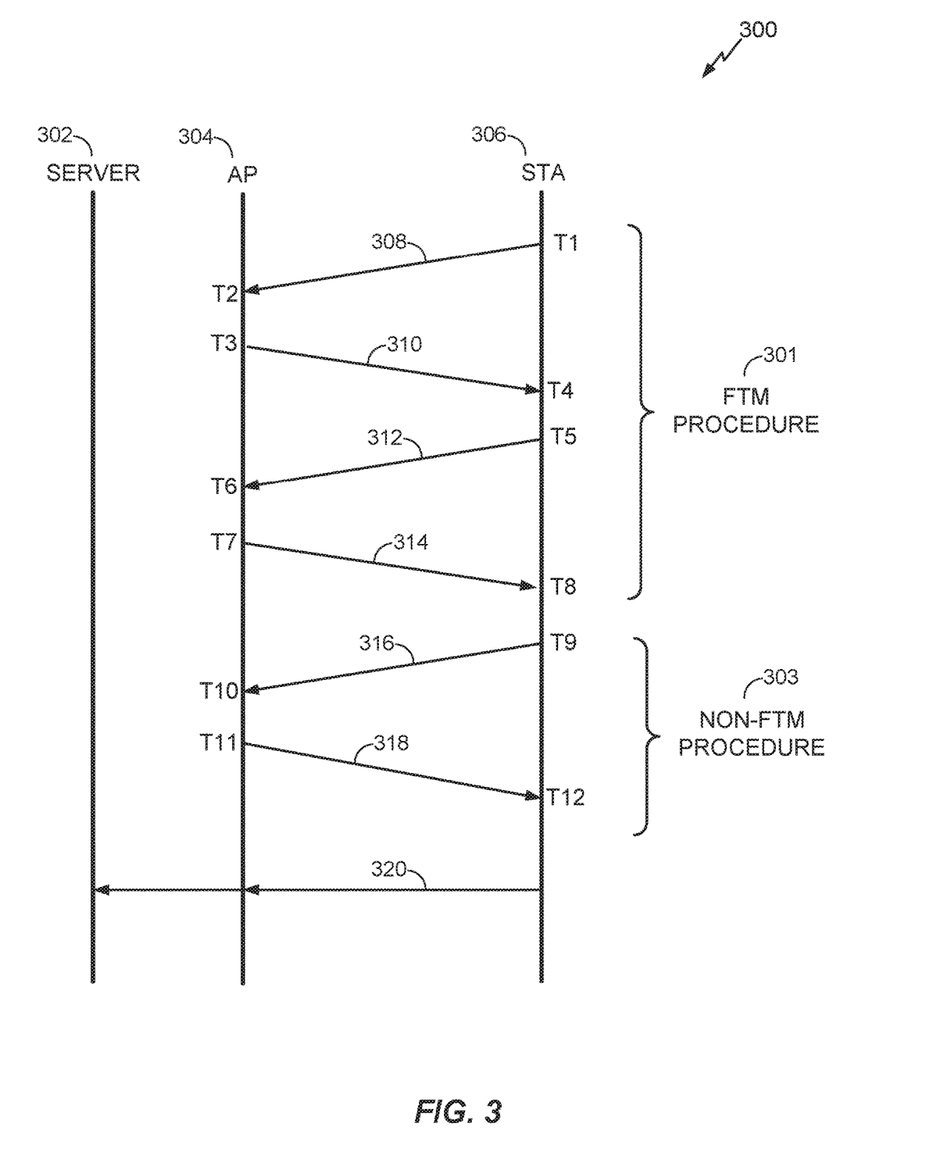
FIG. 3 is a call flow procedure illustrating process of determining a TCF estimate of an access point using both an FTM and a non-FTM procedure.

FIG. 3 is a call flow procedure illustrating process 300 of determining a TCF estimate of an access point using both an FTM and a non-FTM procedure. Process 300 is one possible implementation of process 200 of FIG. 2.

As shown in FIG. 4, process 300 includes an FTM procedure 301 that includes exchanging FTM messages 308-314 between STA 306 and AP 304. In particular, at time T1, STA 306 transmits an FTM request message 308, which is received at the AP 304 a time T2. In response to the FTM request message 308, the AP 304 transmits an FTM response message 310 at time T3. The FTM response message 310 is received at the STA 306 at time T4. The STA 306 then transmits an acknowledgement message 312 at time T5. Furthermore, the STA 306 may generate a first timestamp corresponding to time T4 and a second timestamp corresponding to time T5. At time T6, the AP 304 receives the acknowledgement message 312 and in response thereto, generates timing information message 314 which is sent back to the STA 306. The timing information message 314 includes the time of departure of FTM response message 310 (i.e., time T3) as well as the time of arrival of acknowledgement message 312 (i.e., time T6). In one example, the time of departure corresponding to time T3 and the time of arrival corresponding to time T6 are included in the timing information message 314 as timestamps generated by the AP 304. Upon receipt of the timing information message 314 at time T8, the STA 306 may then calculate a first RTT. In one aspect, the first RTT is calculated based on the times T3, T4, T5, and T6. For example, STA 306 may calculate the first RTT as (T6–T3)–(T5–T4).

Next, STA 306 may perform the non-FTM procedure 303 that includes exchanging non-FTM messages 316 and 318 between the STA 306 and AP 304. At time T9, the STA 306 transmits a non-FTM message 316 to the AP 304. In one example, the non-FTM message 316 is a request to send (RTS) message, but could alternatively be a data message. Also, a time T9, STA 306 generates a timestamp corresponding to a time of departure of the non-FTM message 316 (i.e., time T9). The non-FTM message is received at the AP 304 at time T10, which then transmits a non-FTM response message 318 at time T11. In one aspect, the non-FTM response message 318 is a clear to send (CTS) message, but alternatively could be an acknowledgement message.

The STA 306 then receives the non-FTM response message 318 at time T12 and generates a timestamp corresponding to a time of arrival of the non-FTM response message 318 (i.e., time T12). The STA 306 may then calculate the second RTT based on the times T9 and T12 (e.g., T12–T9). As shown in FIG. 3, the AP 304 may encounter one or more delays between the receipt of the non-FTM message 316 at time T10 and the transmitting of the non-FTM response message 318 at time T11. Thus, the second RTT measurement calculated by the STA 306 is an uncompensated RTT measurement that includes one or more delays incurred at the AP 304 (e.g., delay=T11–T10).

The STA 306 may then calculate the TCF estimate of the AP 304 based on a difference between the second RTT and the first RTT (e.g., TCF estimate=second RTT–first RTT). In one example, the TCF estimate is an estimate of the delay encountered at the AP 304 from time T10 to time T11.

After the STA 306 has calculated the TCF estimate of the AP 304, the STA 306 may send the message 320 to server 302. The message 320 may include a single TCF estimate calculated by the STA 306 or it may include an average of multiple TCF estimates calculated by the STA 306 corresponding to FTM and non-FTM procedures performed with the AP 304.

In some implementations, STA 306 and or AP 304 may be moving, such that the range between the devices is changing. A change in range from the STA 306 to the AP 304 between the FTM procedure 301 and the non-FTM procedure 303 may reduce the accuracy of the resultant TCF estimate. Accordingly, STA 306 may be configured to reduce a difference in a range corresponding to when the FTM procedure 301 is performed to a range corresponding to when the non-FTM procedure 303 is performed. In one aspect, the STA 306 may perform the non-FTM procedure 303 less than a threshold time after completing the FTM procedure 301 so as to reduce the likelihood that the range between the STA 306 and AP 304 has changed significantly. For example, the STA 306 may be configured to transmit the non-FTM message 316 less than a threshold time after receiving the timing information message 314 (e.g., T9−T8<threshold time). In one example, the threshold time is less than approximately 2 milliseconds.

In another example, the STA 306 may be configured to utilize one or more onboard motion sensors (e.g., accelerometer) to detect movement of the STA 306. For instance, the STA 306 may be configured to perform the non-FTM procedure 303 only if a current position of the STA 306 is less than a threshold distance away from a position of the STA 306 when the FTM procedure 301 was performed. Accordingly, utilizing a threshold distance of the STA position between the FTM procedure 301 and the non-FTM procedure 303 may help reduce the difference in ranges corresponding to the first and second RTTs, which in effect may reduce the errors in the TCF estimate.

Figure 4:
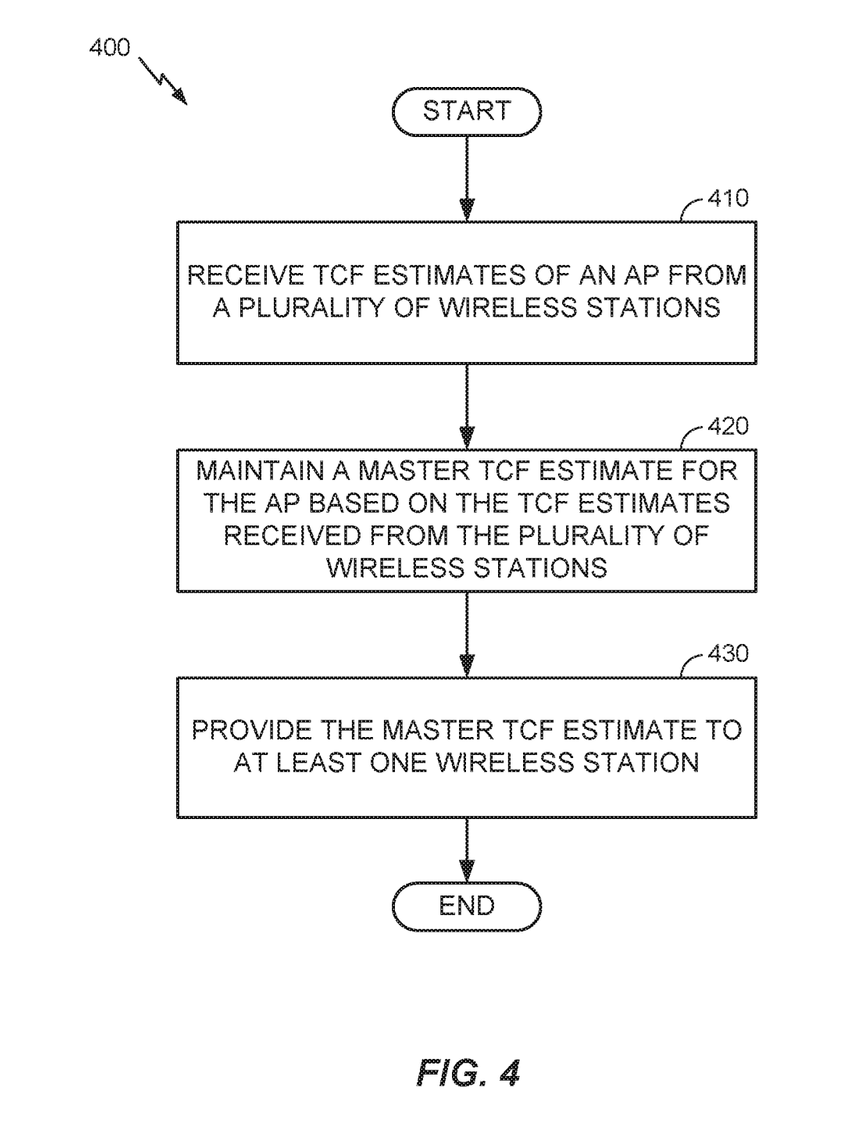
FIG. 4 is a flowchart illustrating a process performed by a server for the crowdsourcing of TCF estimates.

FIG. 4 is a flowchart illustrating a process 400 performed by a server for the crowdsourcing of TCF estimates. Process 400 may be performed by a server, such as server 140 of FIG. 1.

In process block 410, server 140 receives TCF estimates of an AP from a plurality of STAs. For example, server 140 may receive multiple TCF estimates of AP 110A from both STA 120A and STA 120B. Similarly, server 140 may receive multiple TCF estimates of AP 110B from both STA 120A and STA 120B. The TCF estimates of APs 110A and 110B received at the server 140 are based on both an FTM procedure and a non-FTM procedure performed by the STAs 120A and/or 120B, such as the process 200 discussed above. Next, in process block 420, the server maintains a master TCF estimate for the AP 110A based on the TCF estimates received from the plurality of STAs 120A and 120B. For example, the master TCF estimate for AP 110A may include an average of the TCF estimates received from the plurality of STAs 120A and 120B.

In process block 430, the server 140 provides the master TCF estimate to at least one STA (e.g., STA 160). In one example, APs 110A and 110B are FTM-capable APs that are configured to exchange the FTM-messages as discussed above with regards to an FTM procedure. However, STA 160 is not configured to use the FTM procedure. Instead, STA 160 is configured to utilize a non-FTM procedure such as the RTS/CTS-based RTT procedure discussed above. Thus, in one example, the server 140 receives a request for position assistance data from STA 160. The server 140 generates the position assistance data to include the master TCF estimates for one or more APs in the wireless network 100 (e.g., AP 110A and/or AP 110B). The server 140 then sends the assistance data to the STA 160. The STA 160 may then perform the non-FTM procedure to measure a range between the STA 160 and the AP 110A correcting for delays at the AP 110A based on the master TCF estimate for AP 110A included in the assistance data.

In another example, the server 140 may be configured to filter or otherwise reduce the number of master TCF estimates maintained at the server 140. In one aspect, the server 140 may determine whether TCF estimates correspond to two or more co-located APs. If so, the server 140 may combine the TCF estimates corresponding to the co-located APs into a single master TCF estimate for the co-located APs. For example, server 140 may determine that AP 110A and AP 110B are co-located (in close proximity to one another). The server 140 may then combine the TCF estimates received for AP 110A with the TCF estimates received for the AP 110B into a single master TCF estimate. Thus, process block 430 of providing the master TCF estimate may include sending out the same master TCF estimate for AP 110A as for AP 110B. In one example, combining the TCF estimates for co-located APs includes averaging the TCF estimates of the co-located APs together.

Figure 5:
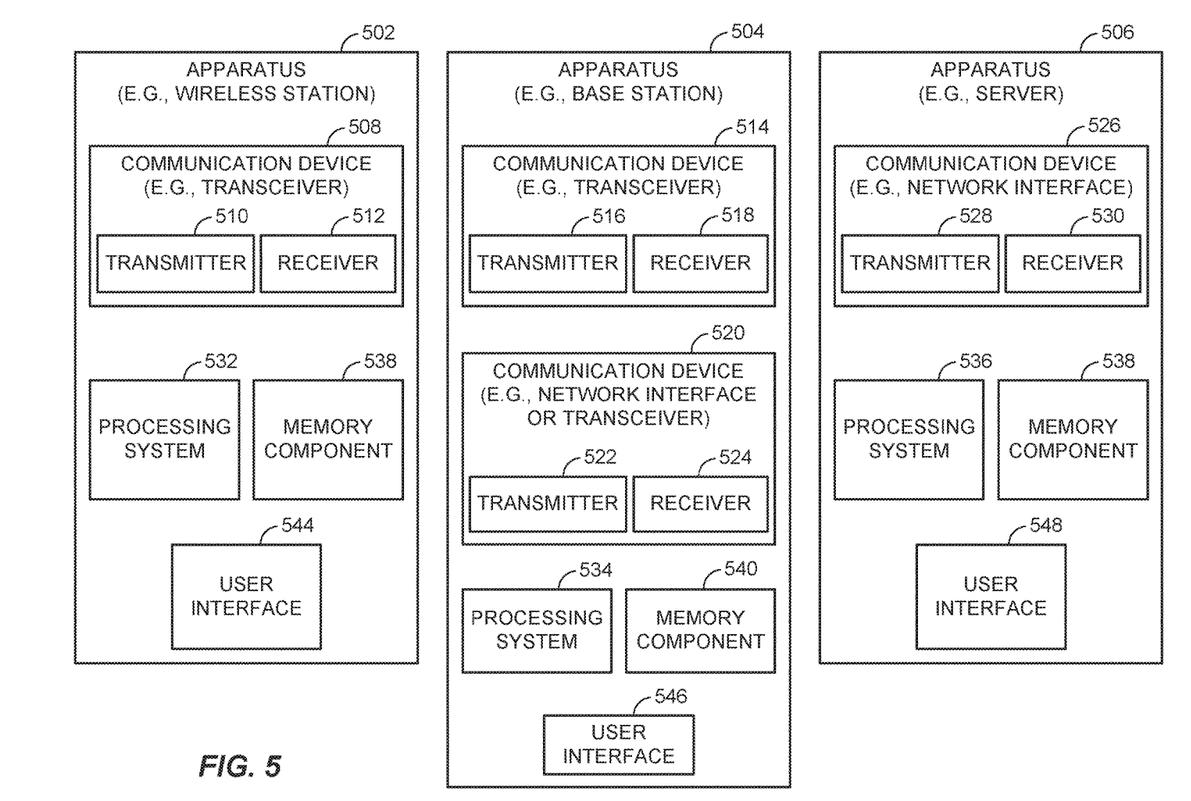
FIG. 5 is a simplified block diagram of several sample aspects of components that may be employed in an apparatus and configured to support communication as taught herein.

FIG. 5 illustrates several sample components (represented by corresponding blocks) that may be incorporated into an apparatus 502, an apparatus 504, and an apparatus 506 (corresponding to, for example, a wireless station (STA), a base station, and a server, respectively) to support the crowdsourcing of TCF estimates, as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 502 and the apparatus 504 each include at least one wireless communication device (represented by the communication devices 508 and 514 (and the communication device 520 if the apparatus 504 is a relay)) for communicating with other nodes via at least one designated radio access technology (RAT). Each communication device 508 includes at least one transmitter (represented by the transmitter 510) for transmitting and encoding signals (e.g., messages, indications, information, and so on) and at least one receiver (represented by the receiver 512) for receiving and decoding signals (e.g., messages, indications, information, pilots, and so on). Similarly, each communication device 514 includes at least one transmitter (represented by the transmitter 516) for transmitting signals (e.g., messages, indications, information, pilots, and so on) and at least one receiver (represented by the receiver 518) for receiving signals (e.g., messages, indications, information, and so on). If the apparatus 504 is a relay station, each communication device 520 may include at least one transmitter (represented by the transmitter 522) for transmitting signals (e.g., messages, indications, information, pilots, and so on) and at least one receiver (represented by the receiver 524) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 504 may also comprise a Network Listen Module (NLM) or the like for performing various measurements.

The apparatus 506 (and the apparatus 504 if it is not a relay station) includes at least one communication device (represented by the communication device 526 and, optionally, 520) for communicating with other nodes. For example, the communication device 526 may comprise a network interface that is configured to communicate with one or more network entities via a wire-based or wireless backhaul. In some aspects, the communication device 526 may be implemented as a transceiver configured to support wire-based or wireless signal communication. This communication may involve, for example, sending and receiving: messages, parameters, or other types of information. Accordingly, in the example of FIG. 5, the communication device 526 is shown as comprising a transmitter 528 and a receiver 530. Similarly, if the apparatus 504 is not a relay station, the communication device 520 may comprise a network interface that is configured to communicate with one or more network entities via a wire-based or wireless backhaul. As with the communication device 526, the communication device 520 is shown as comprising a transmitter 522 and a receiver 524.

The apparatuses 502, 504, and 506 also include other components that may be used in conjunction with the broadcast ranging message operations as taught herein. The apparatus 502 includes a processing system 532 for providing functionality relating to, for example, the performing of an FTM procedure, the performing of a non-FTM procedure, the calculating of a TCF estimate, and the sending of the TCF estimate to a server, as taught herein and for providing other processing functionality. The apparatus 504 includes a processing system 534 for providing functionality relating to, for example, exchanging FTM and/or non-FTM messages, as taught herein and for providing other processing functionality. The apparatus 506 includes a processing system 536 for providing functionality relating to, for example, receiving TCF estimates, maintaining master TCF estimates, providing the master TCF estimates to wireless devices, and for providing other processing functionality. The apparatuses 502, 504, and 506 include memory components 538, 540, and 542 (e.g., each including a memory device), respectively, for maintaining information (e.g., information indicative of reserved resources, thresholds, parameters, and so on). In addition, the apparatuses 502, 504, and 506 include user interface devices 544, 546, and 548, respectively, for providing indications (e.g., audible and/or visual indications) to a user and/or for receiving user input (e.g., upon user actuation of a sensing device such a keypad, a touch screen, a microphone, and so on).

For convenience, the apparatuses 502, 504, and/or 506 are shown in FIG. 5 as including various components that may be configured according to the various examples described herein. It will be appreciated, however, that the illustrated blocks may have different functionality in different designs.

The components of FIG. 5 may be implemented in various ways. In some implementations, the components of FIG. 5 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 508, 532, 538, and 544 may be implemented by processor and memory component(s) of the apparatus 502 (e.g., by execution of appropriate code and/or by appropriate configuration of processor components). Similarly, some or all of the functionality represented by blocks 514, 520, 534, 540, and 546 may be implemented by processor and memory component(s) of the apparatus 504 (e.g., by execution of appropriate code and/or by appropriate configuration of processor components). Also, some or all of the functionality represented by blocks 526, 536, 542, and 548 may be implemented by processor and memory component(s) of the apparatus 506 (e.g., by execution of appropriate code and/or by appropriate configuration of processor components).

Figure 6:
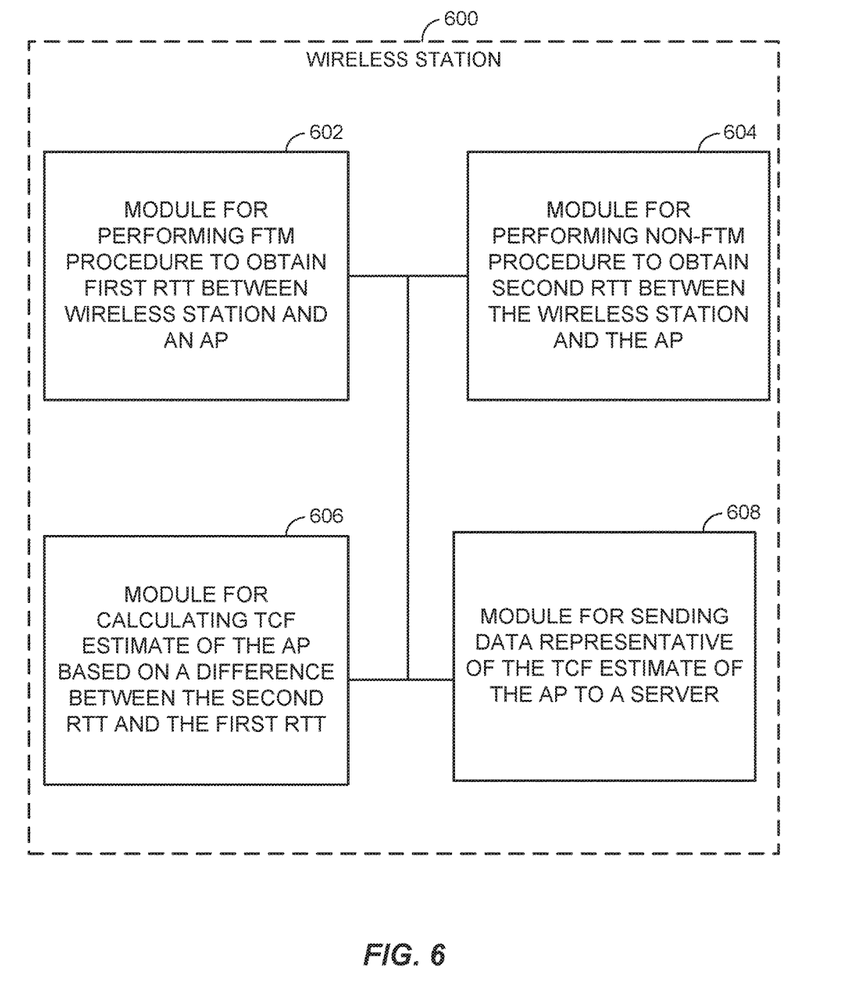
FIGS. 6 and 7 are other simplified block diagrams of several sample aspects of apparatuses configured to support communication as taught herein.

FIG. 6 illustrates an example wireless station (STA) 600 represented as a series of interrelated functional modules. STA 600 is one possible implementation of STAs 120A, 120B, and/or apparatus 502. A module 602 for performing an FTM procedure to obtain a first RTT between the STA 600 and an AP may correspond at least in some aspects to, for example, a communication device 508, as discussed herein. A module 604 for performing a non-FTM procedure to obtain a second RTT between the STA 600 and the AP may correspond at least in some aspects to, for example, a communication device 508, as discussed herein. A module 606 for calculating a TCF estimate of the AP based on a difference between the second RTT and the first RTT may correspond, at least in some aspect to, for example, processing system 532 and/or memory component 538. A module 608 for sending data representative of the TCF estimate of the AP to a server may correspond at least in some aspects to, for example, communication device 508, as discussed herein.

Figure 7:
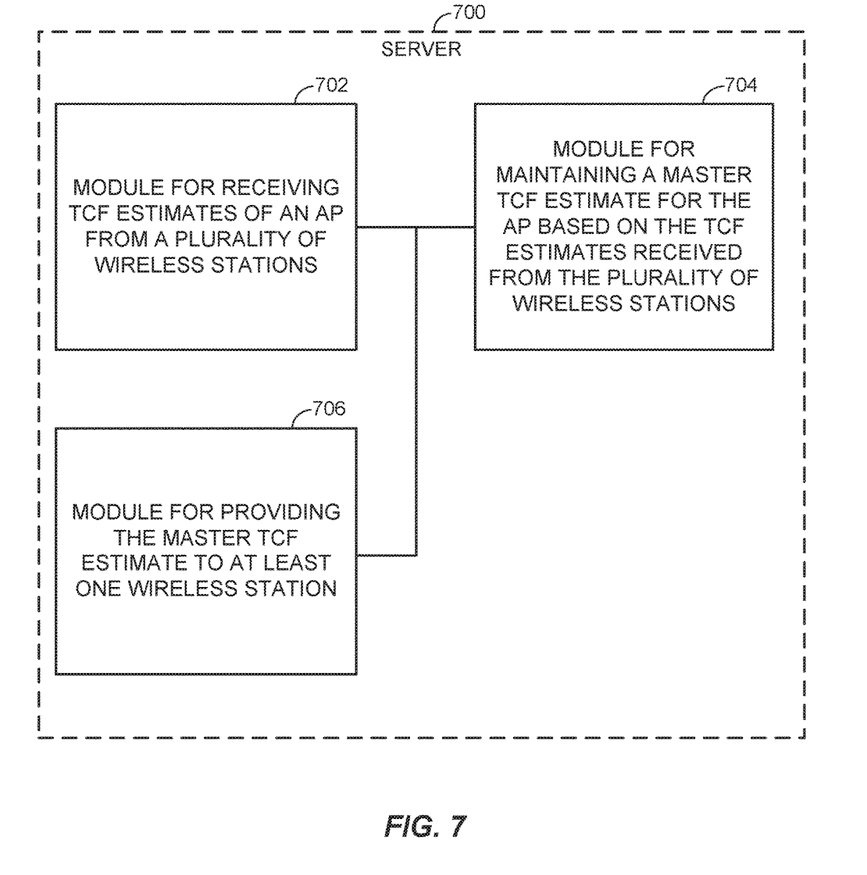

FIG. 7 illustrates an example server 700 represented as a series of interrelated functional modules. Server 700 is one possible implementation of server 140 and/or apparatus 506. A module 702 for receiving TCF estimates of an AP from a plurality of wireless stations may correspond at least in some aspects to, for example, a communication device 526, as discussed herein. A module 704 for maintaining a master TCF estimate for the AP based on the TCF estimates received from the plurality of wireless stations may correspond at least in some aspects to, for example, a processing system 536 and/or memory component 538, as discussed herein. A module 706 for providing the master TCF estimate to at least one wireless station may correspond at least in some aspects to, for example, a communication device 526, as discussed herein.

The functionality of the modules of FIGS. 6 and 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 6 and 7, as well as other components and functions described herein, may be implemented using any suitable means. Such means also may be implemented, at least in part, using corresponding structure as taught herein. For example, the components described above in conjunction with the "module for" components of FIGS. 6 and 7 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method as discussed above with reference to FIGS. 2-4.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method, comprising:
   performing, by a wireless station, a fine timing measurement (FTM) procedure that includes exchanging one or more FTM messages between the wireless station and an access point to obtain a first round-trip time (RTT) between the wireless station and the access point;
   performing, by the wireless station, a non-FTM procedure to obtain a second RTT between the wireless station and the access point, wherein the non-FTM procedure comprises:
      transmitting a non-FTM message from the wireless station to the access point;
      receiving a non-FTM response message from the access point in response to the non-FTM message transmitted to the access point; and
      calculating, by the wireless station, the second RTT based on a difference between a time of arrival of the non-FTM response message and a time of departure of the non-FTM message;
   calculating a turn-around calibration factor (TCF) estimate of the access point based on a difference between the second RTT and the first RTT; and
   sending data representative of the TCF estimate of the access point to a server.

2. The method of claim 1, further comprising:
   repeating the performing of the FTM procedure, the performing of the non-FTM procedure, and the calculating of the TCF estimate for a plurality of positions of the wireless station to obtain an average TCF estimate of the access point, wherein the data representative of the TCF estimate is the average TCF estimate.

3. The method of claim 1, further comprising:
   repeating the performing of the FTM procedure, the performing of the non-FTM procedure, and the calculating of the TCF estimate for a same position of the wireless station to obtain an average TCF estimate of the access point, wherein the data representative of the TCF estimate is the average TCF estimate.

4. The method of claim 1, wherein the exchanging of the one or more FTM messages between the wireless station and the access point of the FTM procedure comprises:
   transmitting an FTM request message from the wireless station to the access point;
   receiving an FTM response message from the access point;
   transmitting an FTM acknowledgement message from the wireless station to the access point; and
   receiving timing information from the access point, wherein the timing information comprises a time of departure of the FTM response message from the access point and a time of arrival of the FTM acknowledgement message at the access point.

5. The method of claim 4, wherein transmitting the non-FTM message from the wireless station to the access point comprises transmitting the non-FTM message from the wireless station less than a threshold time after receiving the timing information to reduce a difference between a range corresponding to the first RTT and a range corresponding to the second RTT.

6. The method of claim 5, wherein the threshold time is less than approximately 2 milliseconds.

7. The method of claim 1, wherein performing the non-FTM procedure is in response to determining that a current position of the wireless station is less than a threshold distance away from a position of the wireless station when the FTM procedure was performed to reduce a difference between a range corresponding to the first RTT and a range corresponding to the second RTT.

8. The method of claim 1, wherein the non-FTM message comprises a Request To Send (RTS) message, and wherein the non-FTM response message comprises a Clear-To-Send (CTS) message.

9. The method of claim 1, wherein the TCF estimate is an estimate of one or more delays at the access point between receiving the non-FTM message at the access point and transmitting the non-FTM response message by the access point.

10. The method of claim 9, wherein calculating the second RTT comprises calculating the second RTT without compensating for the one or more delays such that the second RTT is an uncompensated RTT measurement that includes the one or more delays.

11. A wireless station, comprising:
a transceiver;
at least one processor; and
at least one memory coupled to the at least one processor, the at least one processor and the at least one memory being configured to direct the wireless station to:
perform a fine timing measurement (FTM) procedure that includes exchanging one or more FTM messages between the transceiver and an access point to obtain a first round-trip time (RTT) between the wireless station and the access point;
perform a non-FTM procedure to obtain a second RTT between the wireless station and the access point, wherein the non-FTM procedure comprises:
transmitting, with the transceiver, a non-FTM message from the wireless station to the access point;
receiving, with the transceiver, a non-FTM response message from the access point in response to the non-FTM message transmitted to the access point; and
calculating the second RTT based on a difference between a time of arrival of the non-FTM response message and a time of departure of the non-FTM message;
calculate a turn-around calibration factor (TCF) estimate of the access point based on a difference between the second RTT and the first RTT; and
send data representative of the TCF estimate of the access point to a server.

12. The wireless station of claim 11, wherein the at least one processor and the at least one memory are further configured to direct the wireless station to:
repeat the performing of the FTM procedure, the performing of the non-FTM procedure, and the calculating of the TCF estimate for a plurality of positions of the wireless station to obtain an average TCF estimate of the access point, wherein the data representative of the TCF estimate is the average TCF estimate.

13. The wireless station of claim 11, wherein the at least one processor and the at least one memory are further configured to direct the wireless station to:
repeat the performing of the FTM procedure, the performing of the non-FTM procedure, and the calculating of the TCF estimate for a same position of the wireless station to obtain an average TCF estimate of the access point, wherein the data representative of the TCF estimate is the average TCF estimate.

14. The wireless station of claim 11, wherein the exchanging of the one or more FTM messages between the wireless station and the access point of the FTM procedure comprises:
transmitting an FTM request message from the wireless station to the access point;
receiving an FTM response message from the access point;
transmitting an FTM acknowledgement message from the wireless station to the access point; and
receiving timing information from the access point, wherein the timing information comprises a time of departure of the FTM response message from the access point and a time of arrival of the FTM acknowledgement message at the access point.

15. The wireless station of claim 14, wherein transmitting the non-FTM message from the wireless station to the access point comprises transmitting the non-FTM message from the wireless station less than a threshold time after receiving the timing information to reduce a difference between a range corresponding to the first RTT and a range corresponding to the second RTT.

16. The wireless station of claim 11, wherein the at least one processor and the at least one memory are further configured to direct the wireless station to perform the non-FTM procedure in response to determining that a current position of the wireless station is less than a threshold distance away from a position of the wireless station when the FTM procedure was performed to reduce a difference between a range corresponding to the first RTT and a range corresponding to the second RTT.

17. The wireless station of claim 11, wherein the non-FTM message comprises a Request To Send (RTS) message, and wherein the non-FTM response message comprises a Clear-To-Send (CTS) message.

18. The wireless station of claim 11, wherein the TCF estimate is an estimate of one or more delays at the access point between receiving the non-FTM message at the access point and transmitting the non-FTM response message by the access point.

19. The wireless station of claim 18, wherein the at least one processor and the at least one memory are further configured to direct the wireless station to calculate the second RTT without compensating for the one or more delays such that the second RTT is an uncompensated RTT measurement that includes the one or more delays.

20. A method, comprising:
receiving, at a server, turn-around calibration factor (TCF) estimates of an access point, from a plurality of wireless stations, wherein each TCF estimate is associated with a respective wireless station of the plurality of wireless stations and is based on both a fine timing measurement (FTM) procedure and a non-FTM procedure performed by the respective wireless station with the access point,
wherein the FTM procedure includes exchanging one or more FTM messages between the respective wireless station and the access point to obtain a first round-trip time (RTT), the non-FTM procedure includes obtaining a second RTT between the respective wireless station and the access point, and the TCF estimate of the access point is based on a difference between the second RTT and the first RTT;

maintaining, at the server, a master TCF estimate for the access point based on the TCF estimates received from the plurality of wireless stations; and providing the master TCF estimate to at least one wireless station.

21. The method of claim 20, wherein maintaining the master TCF estimate for the access point comprises averaging the TCF estimates received from the plurality of wireless stations.

22. The method of claim 20, further comprising:
receiving, at the server, a request for position assistance data from the at least one wireless station;
generating the position assistance data to include the master TCF estimate of the access point; and
sending the position assistance data to the at least one wireless station.

23. The method of claim 20, wherein the access point is one of a plurality of access points, the method further comprising:
receiving TCF estimates for each of the plurality of access points;
determining whether at least two access points of the plurality of access points are co-located; and
combining the TCF estimates corresponding to the at least two access points to generate a combined master TCF estimate for the at least two access points.

24. The method of claim 23, wherein the combined master TCF estimate is an average of the TCF estimates corresponding to the at least two access points.

25. A server, comprising:
at least one processor; and
at least one memory coupled to the at least one processor, the at least one processor and the at least one memory being configured to direct the server to:
receive turn-around calibration factor (TCF) estimates of an access point, from a plurality of wireless stations, wherein each TCF estimate is associated with a respective wireless station of the plurality of wireless stations and is based on both a fine timing measurement (FTM) procedure and a non-FTM procedure performed by the respective wireless station with the access point,
wherein the FTM procedure includes exchanging one or more FTM messages between the respective wireless station and the access point to obtain a first round-trip time (RTT), the non-FTM procedure includes obtaining a second RTT between the respective wireless station and the access point, and the TCF estimate of the access point is based on a difference between the second RTT and the first RTT;
maintain a master TCF estimate for the access point based on the TCF estimates received from the plurality of wireless stations; and
provide the master TCF estimate to at least one wireless station.

26. The server of claim 25, wherein maintaining the master TCF estimate for the access point comprises averaging the TCF estimates received from the plurality of wireless stations.

27. The server of claim 25, wherein the at least one processor and the at least one memory are further configured to direct the server to:
receive a request for position assistance data from the at least one wireless station;
generate the position assistance data to include the master TCF estimate of the access point; and
send the position assistance data to the at least one wireless station.

28. The server of claim 27, wherein the access point is an FTM-capable access point and wherein the at least one wireless station is not configured to use the FTM procedure.

29. The server of claim 25, wherein the access point is one of a plurality of access points, and wherein the at least one processor and the at least one memory are further configured to direct the server to:
receive TCF estimates for each of the plurality of access points;
determine whether at least two access points of the plurality of access points are co-located; and
combine the TCF estimates corresponding to the at least two access points to generate a combined master TCF estimate for the at least two access points.

30. The server of claim 29, wherein the combined master TCF estimate is an average of the TCF estimates corresponding to the at least two access points.

* * * * *